United States Patent
Franaszek et al.

(10) Patent No.: US 6,279,092 B1
(45) Date of Patent: Aug. 21, 2001

(54) KERNEL IDENTIFICATION FOR SPACE MANAGEMENT IN COMPRESSED MEMORY SYSTEMS

(75) Inventors: Peter A. Franaszek, Mount Kisco; Philip Heidelberger, Cortlandt Manor; Dan E. Poff, Mahopac, all of NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/226,367

(22) Filed: Jan. 6, 1999

(51) Int. Cl.[7] .................................................. G06F 12/02
(52) U.S. Cl. ................................................... 711/170
(58) Field of Search .................................. 711/165, 209, 711/170

(56) References Cited

U.S. PATENT DOCUMENTS

| | | |
|---|---|---|
| 4,646,312 * | 2/1987 | Goldsbury et al. . |
| 4,747,044 * | 5/1988 | Schmidt et al. . |
| 4,914,570 * | 4/1990 | Peacock . |
| 5,490,260 * | 2/1996 | Miller et al. . |
| 5,940,871 * | 8/1999 | Goyal et al. ........................... 711/206 |

* cited by examiner

Primary Examiner—Jack A. Lane
(74) Attorney, Agent, or Firm—Scully, Scott, Murphy & Presser; Robert P. Tassinari, Jr., Esq.

(57) ABSTRACT

An improved method, system, and a computer program storage device for management of compressed main memory allocation and utilization. The present invention has features which advantageously avoid system abends or inefficient operation that would otherwise result. We identify 3 types of addresses associated with a page: a virtual address, a real address, and a physical address. The OS is responsible for converting virtual addresses to real addresses, and the memory controller is responsible for converting real addresses to the physical addresses where the compressed data are actually stored. We assume that the memory controller has the capability to store a page either compressed, or uncompressed. Depending on the characteristics of the controller, this may be done either on a per page basis via an indicator bit that is settable by the OS, or on a range of real addresses.

30 Claims, 4 Drawing Sheets

KERNEL IDENTIFICATION FOR SPACE MANAGEMENT IN COMPRESSED MEMORY SYSTEMS

CROSS-REFERENCE TO RELATED PATENT APPLICATION

The present invention is related to the following patent applications: Compression Store Addressing, by Franaszek, Ser. No. 08/603,976, filed Feb. 20, 1996 now U.S. Pat. No. 5,864,859; System and Method for Reducing Memory Fragmentation by Assigning Remainder to Shared Memory Blocks on a Best Fit Basis, by Franaszek, Ser. No. 08/701,143, filed Aug. 21, 1996 now U.S. Pat. No. 5,761,536; and Space Management in Compressed Main Memory, by Franaszek et al., Ser. No. 08/859,865, filed May 21, 1997.

These patent applications are commonly assigned to IBM Corporation, Armonk, N.Y. and are hereby incorporated herein by reference in their entirety.

FIELD OF THE INVENTION

This invention relates in general to operating systems for computers, and in particular to managing compressed main memory in a computer system.

BACKGROUND OF THE INVENTION

An emerging development in computer organization is the use of data compression for the contents of main memory, that part of the random access memory hierarchy which is managed by the operating system ("OS") and where typically the unit of allocation is a page.

In compressed memory systems, a page may occupy a variable amount of physical memory space. For example, as described in the aforementioned related patent application, pages occupy or share a variable number of fixed size blocks; pages may be of nominal 4K size and blocks of size 256 bytes. Generally, the number of such blocks occupied by a page will vary with its contents, due to changes in compressibility.

Typically, each cache line is compressed prior to being written into memory, using a standard sequential or a parallel compression algorithm. Examples of compression algorithms include Lempel-Ziv coding and its generalizations, Huffman coding and arithmetic coding. See, for example, J. Ziv and A. Lempel, "A Universal Algorithm for Sequential Data Compression," IEEE Transactions on Information Theory, IT-23, pp. 337–343 (1977), which is hereby incorporated by reference in its entirety. A parallel approach is described in co-pending (allowed) U.S. patent application Ser. No. 08/498,948, entitled Parallel Compression and Decompression Using a Cooperative Dictionary, by Franaszek et al., filed on Jul. 6, 1995 ("Franaszek"). The Franaszek patent application is commonly assigned with the present invention to IBM Corporation, Armonk, N.Y. and is hereby incorporated herein by reference in its entirety. A convenient way to perform this compression is by automatically compressing the data using special-purpose hardware, with a minimum of intervention by the software or operating system. This permits compression/decompression to be done rapidly, avoiding what might otherwise be long delays associated with software compression/decompression.

Changes to a page stored in main memory occur on write backs from the cache. A changed cache line may require a larger number of blocks upon write back, than previously. If there are an insufficient number of free blocks to hold the changed line, the system abends. Thus, there is a need to maintain adequate free space under fluctuating compression efficiencies. The present invention addresses these needs.

Copending patent application Ser. No. 09/021,333 discloses a method for preventing system abends. That method requires that the hardware compression controller issue an emergency interrupt when the amount of physical free memory drops below a threshold T0 (blocks).

T0 is determined to be large enough so that physical memory cannot expand by more than T0 blocks during the process of stopping all processing except that required to free up a sufficient amount of memory (by zeroing pages for which a valid copy exists on disk, and/or paging out pages to disk and then zeroing them) to permit continued operation.

The present invention also requires generating an interrupt but improves upon that method by being easier to implement.

SUMMARY OF THE INVENTION

Accordingly, the present invention is directed to an improved method, system, and a computer program storage device (e.g., including software embodied on a magnetic, electrical, optical, or other storage device) for management of compressed main memory allocation and utilization. The present invention has features which advantageously avoid system abends or inefficient operation that would otherwise result.

In accordance with this invention, we identify 3 types of addresses associated with a page: a virtual address, a real address, and a physical address. The OS is responsible for converting virtual addresses to real addresses via usual memory management techniques.

The memory controller is responsible for converting real addresses to the physical addresses where the compressed data are actually stored. We assume that the memory controller has the capability to store a page either compressed, or uncompressed.

Depending on the characteristics of the controller, this may be done either:

1. on a per page basis via an indicator bit that is settable by the OS
2. on a range of real addresses, i.e., all real addresses in a certain range (or ranges) are stored uncompressed and all other pages are stored compressed.

We further assume that the hardware is capable of separately counting the number of blocks that are stored in the compressed and uncompressed regions; we refer to these counts as NC and NU, respectively. If, for example, there are 16 256 byte blocks per 4K byte page, then NU=16 * the number of pages allocated uncompressed. These counts can be made available to the OS upon request to the hardware.

Using one of the above mechanisms, the OS assigns pages in the kernel (or a specified subset of the kernel) to be uncompressed. For example, in implementing 2 above, many OS's assign the kernel virtual addresses in a fixed, pre-determined and known range. Thus a request for a kernel page may be identified by the virtual address into which the real address is mapped. Thus, upon seeing a request for a virtual address in the kernel's virtual address range, the OS can assign a real address in the uncompressed range. By making this real address range at least as large as the kernel's virtual address range, any such request for a kernel page can always be satisfied by a page with a real address in the required range.

Alternatively, specific requests for kernel pages can be tagged when the request is made, thereby indicating that the page should be uncompressed. As such pages are already uncompressed, they cannot expand.

In a system with compressed main memory, the invention prevents system abends due to a deterioration in the compression ratio. The operating system identifies certain pages as being in a critical part of the kernel. These critical pages are either left uncompressed, or are compressed but their aggregate compression ratio is accounted for separately. The memory controller issues an emergency interrupt when the amount of free space drops below a certain level. The system responds to the interrupt by creating new free space (by writing pages to disk, if necessary, and zeroing them).

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

DETAILED DESCRIPTION

Figure 1:
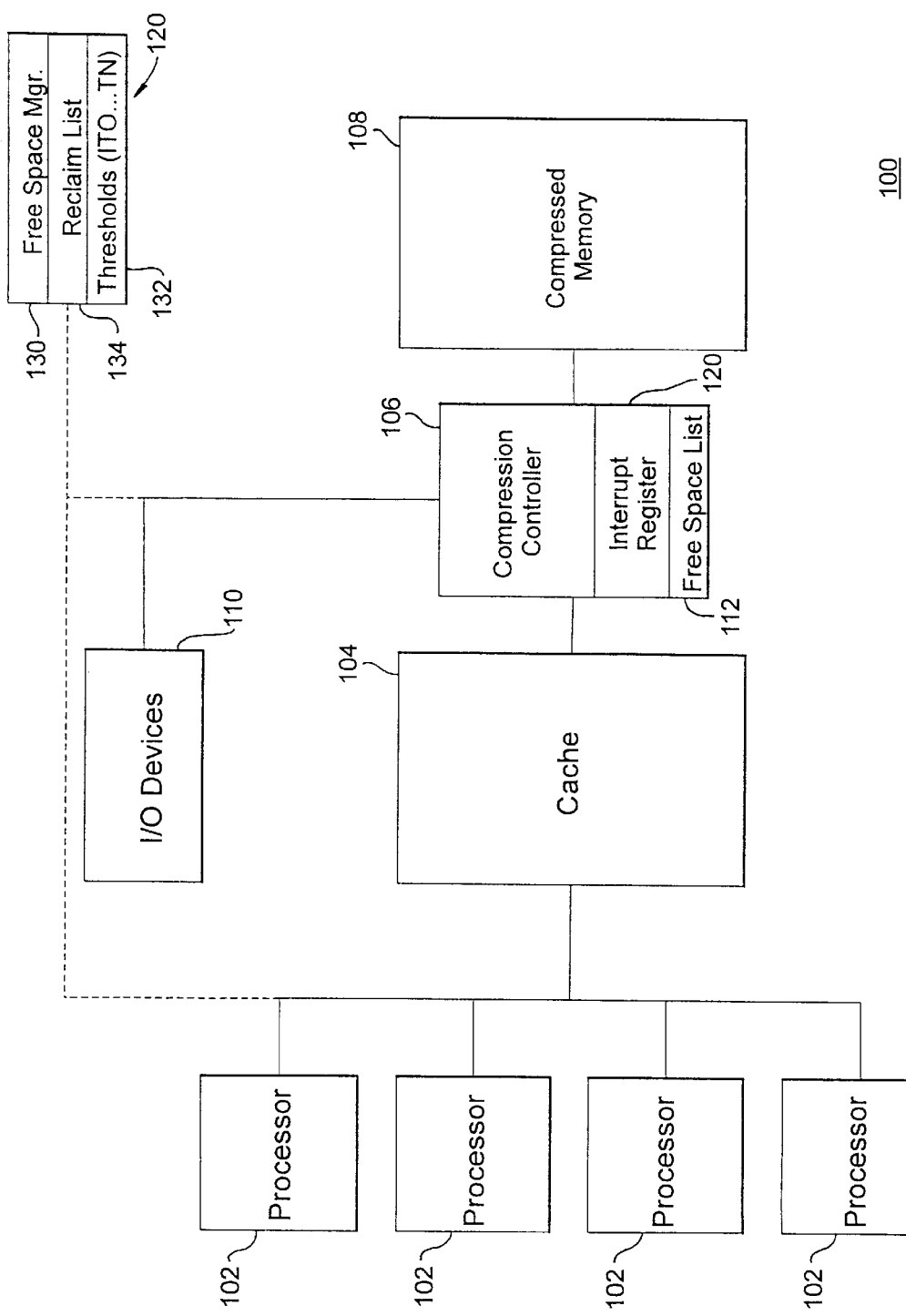
FIG. 1 depicts one example of a computing environment incorporating and using the memory management capability of the present invention.

FIG. 1 depicts one example of a block diagram of a computing system 100 incorporating the memory management capability of the present invention. In one embodiment, the computing system 100 includes a large server system, which except for the compression controller 106 (described below) is offered by International Business Machines Corporation under the trademark RS/6000. As depicted, the computing system 100 includes, for example, one or more processors 102, operating system 125, a cache 104, a compression controller 106, compressed main memory 108 and one or more input/output ("I/O") devices 110.

As is known, processor(s) 102 are the controlling center of the computing system 100. The processor(s) 102 execute at least one operating system ("OS") (125) which controls the execution of programs and processing of data. Examples include but are not limited to an OS such as that sold under the trademark AIX by International Business Machines ("IBM") Corporation and an OS sold under the trademark WINDOWS NT by the Microsoft Corporation. As will be described below, the operating system 125 is one component of the computing environment 100 that can incorporate and use the capabilities of the present invention.

Coupled to the processor(s) 102 and the compression controller 106 is a cache memory 104. The cache memory 104 provides a short term, high-speed, high-capacity computer memory for data retrieved by the compression controller 106 from the I/O devices 110 and/or the compressed main memory 108.

Figure 3:
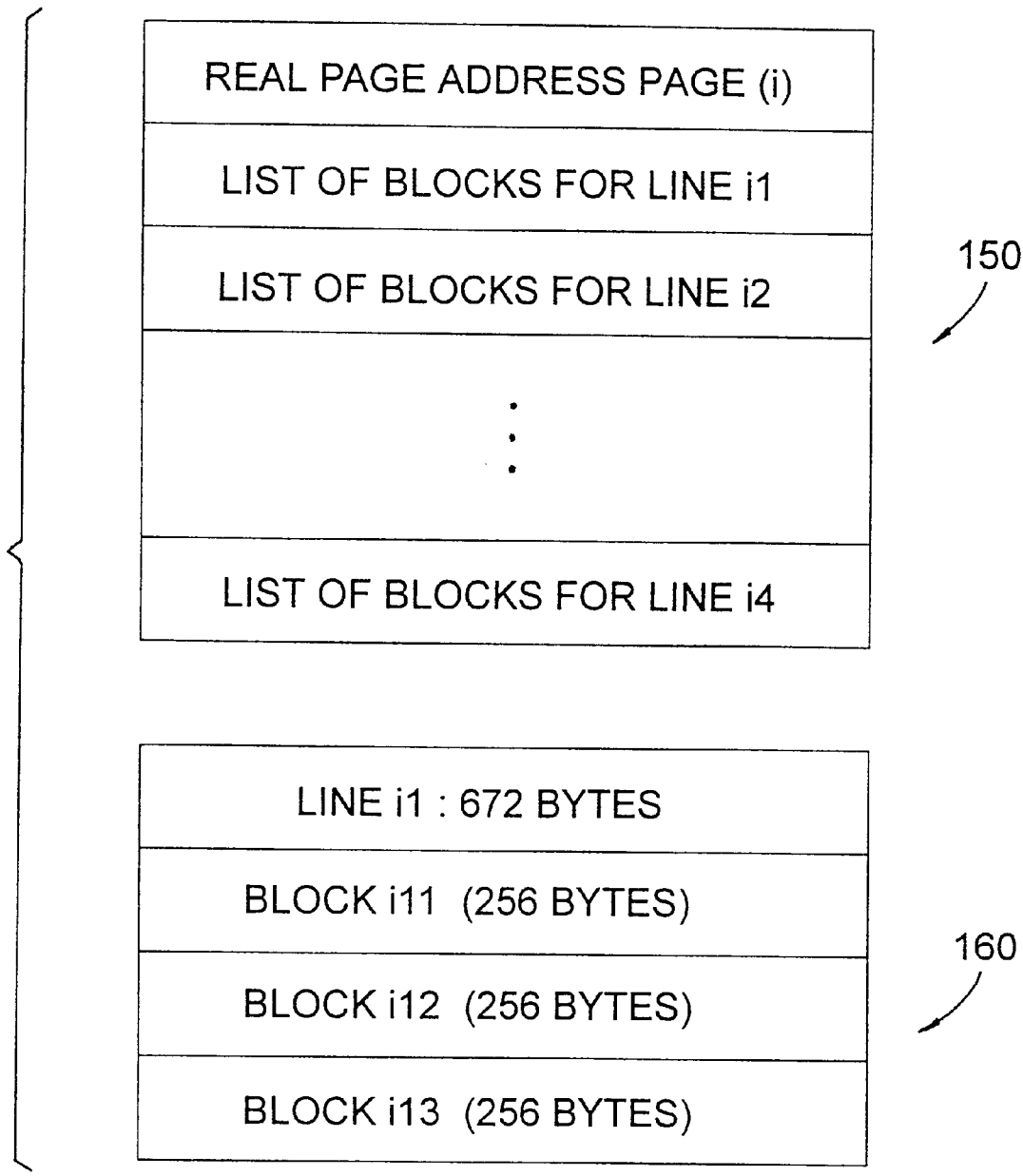
FIG. 3 depicts one example of an organization of physical addresses of pages of compressed main memory.

Coupled to the cache 104 and the compressed memory 108 is the compression controller 106, which manages, for example, the transfer of information between the I/O devices 110 and the cache 104, and/or the transfer of information between the compressed main memory 108 and the cache 104. Functions of the compression controller include the compression/decompression of data, and the storing of the resulting compressed lines in blocks of fixed size. As will be described with reference to FIG. 3, this preferably includes a mapping from real page addresses, as seen by the operating system, to addresses of fixed-size blocks in memory.

The compressed main memory 108, which is also coupled to the compression controller 106, contains data which is compressed, for example, in units of cache lines. In one embodiment, each page includes four cache lines. Cache lines are decompressed and compressed respectively when inserted or cast-out of cache 104. Pages from I/O devices 110 are also compressed (in units of cache lines) on insertion into main memory 108. In this example, I/O is done into and out of the cache 104. Although a single cache is shown for simplicity, an actual system may include a hierarchy of caches.

Figure 2:
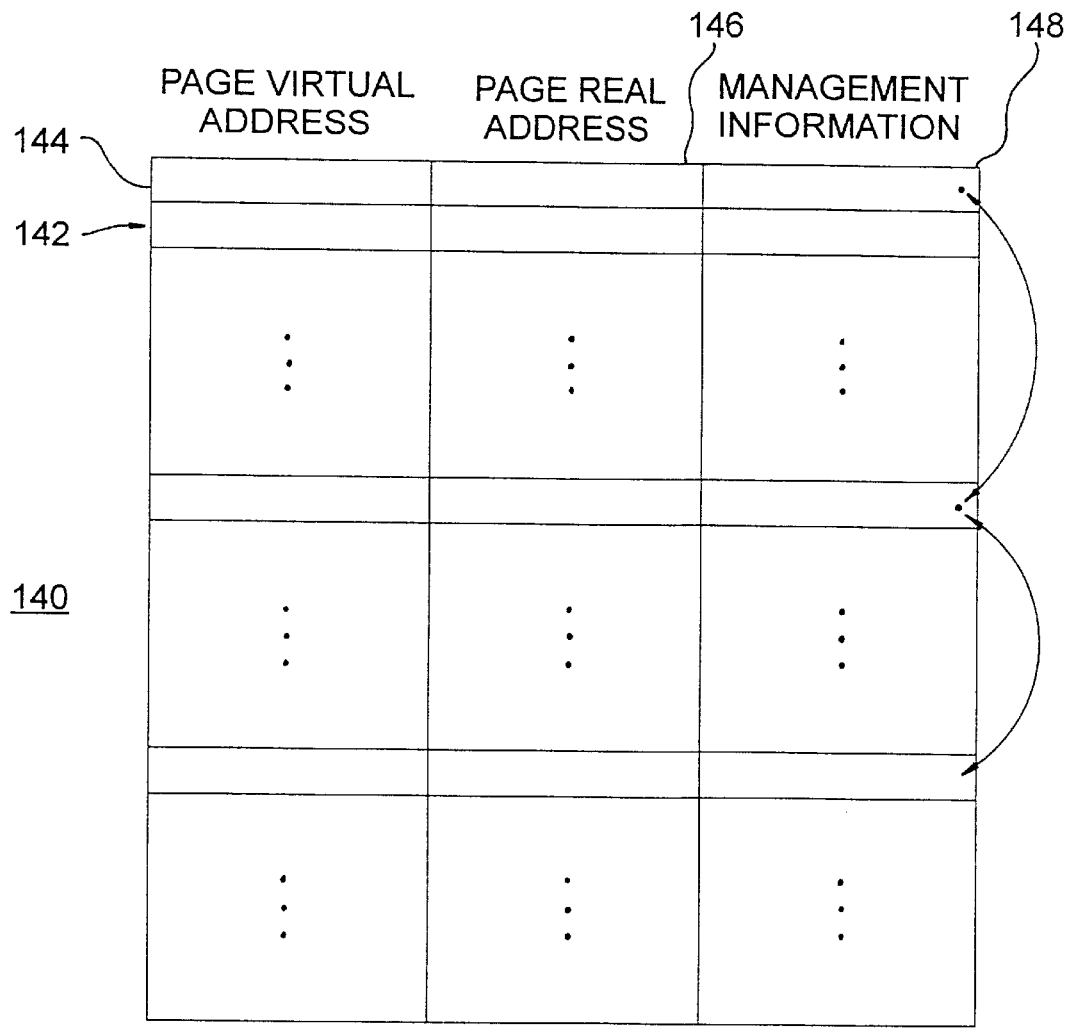
FIG. 2 depicts one illustration of a page table.

As is well known, information relating to pages of memory can be stored in one or more page tables in the main memory or the cache 104 and is used by the OS 125. One example of a page table 140 is depicted in FIG. 2. Page table 140 includes a plurality of page table entries 142 and each entry includes, for instance, a virtual address 144 for a given page; a real address 146 corresponding to the virtual address for that page; and a set of management information 148 for the page, for example, a use bit field indicating whether the page has been referenced and a read/write or read-only access field indicating the allowed type of access.

The real address of a page is mapped into a set of physical addresses (e.g., identifiers of blocks of storage) for each cache line, when the page is requested from main memory 108. In one example, this is accomplished using tables 150 and 160, illustrated in FIG. 3. Table 150 can be stored in the compression controller 106 and Table 160 can be stored in the memory 108. Table 150 includes, for instance, what is termed the real page address for a page, Page (i), as well as a list of the memory blocks for each line of the page. For example, each page could be 4K bytes in size and includes four cache lines. Each cache line is 1 k bytes in size.

Compressed cache lines are stored in fixed-size blocks of 256 bytes, as one example. Table 160 includes, for instance, the compressed blocks making up a particular line of Page (i). For example, line 1 of Page (i) includes three compressed blocks, each having 256 bytes. Since, in this example, each page can include up to four cache lines and each cache line can include up to four compressed blocks of memory, each page may occupy up to 16 blocks of memory.

Referring again to the system depicted in FIG. 1, the compression controller 106 can include one or more interrupt registers 120 and a free-space list 112. One implementation of the free-space list is as a linked list, which is well known to those of skill in the art.

Here, the compression controller 106 performs various functions, including:
  a) Compressing lines which are cast out of the cache 104, and storing the results in some number of fixed-size blocks drawn from the free-space list 112;
  b) Decompressing lines on cache fetches;
  c) Blocks freed by operations such as removing a line from memory, or compressing a changed line which now uses less space, are added to the free-space list 112;
  d) Maintaining a count F of the number of blocks on the free-space list 112. This count is preferably available to the OS 125 on request;

e) Maintaining a set of thresholds implemented as interrupt registers (120) on the size of F. Changes in F that cause thresholds to be crossed cause a processor interrupt. Preferably, each threshold can be dynamically set by software and at least those related to measured quantities are stored in an interrupt register 120 in the controller 106.

The free-space manager 130 maintains an appropriate number of blocks on the free-space list 112. Too few such blocks causes the system to abend or suspend execution of applications pending page-outs, while having too many such blocks is wasteful of storage, producing excessive page faults. The free-space manager also sets the interrupt registers 120 with one or more thresholds (T0 ... TN) at which interrupts are generated. As stated, threshold values which are related to actual measured values, as opposed to periodically measured values, are stored in one or more interrupt registers 120. Examples of thresholding policies and control processes are described in detail in copending patent application Ser. No. 09/021,333.

Those skilled in the art will appreciate that there are various alternative implementations within the spirit and scope of the present invention. For example, various functions embodied in the compression controller 106 can be performed by other hardware and/or software components within the computing environment 100. As one example, the compressed memory management technique can be performed by programs executed by the processor(s) 102.

In a system without memory compression, the allocation of a page to a program by the operating system corresponds exactly to the granting of a page frame. That is, there is a one-to-one correspondence between addresses for pages in memory and space utilization. This is not the case here, since each line in a page can occupy a variable number of data blocks (say 0 to 4 as an example). Moreover, the number of blocks occupied by a given line may vary as it is modified.

These variations, occurring at processor speeds, may lead to memory-usage expansions which are much faster than can be handled by the page-out mechanism. Thus there is a need under some conditions to stop all application processing while page-outs are in progress.

Another difference between the operation of the current system and a conventional one is that there will in general be a delay between granting a page, and its full utilization of memory. Failure to account for such delayed expansion can mean an over commitment of memory space and an increased likelihood of rapid expansion. The result may be an oscillation between granting too many pages and halting all processing while the resulting required page-outs are pending. The system disclosed herein avoids such compression-associated memory thrashing.

Figure 4:
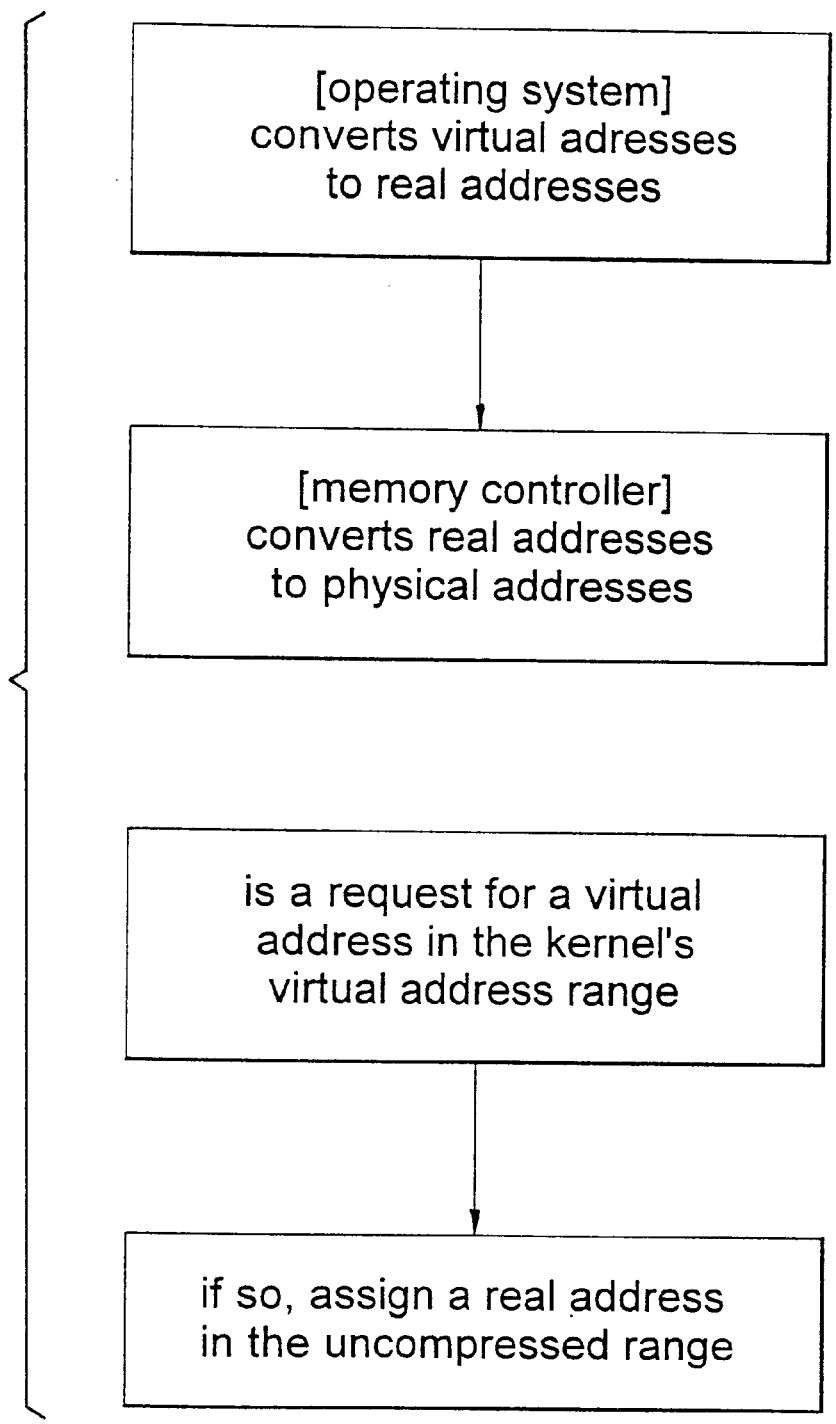
FIG. 4 depicts an example of a method for managing memory in accordance with the present invention.

FIG. 4 depicts an example of a computerized method having features for managing compressed memory in accordance with the present invention. Those skilled in the art will appreciate that methods disclosed herein may be implemented as software for execution on a computer or other processor-base device. The software may be embodied on a magnetic, electrical, optical, or other persistent program storage device, including but not limited to: magnetic disks, DASD, bubble memory; tape; optical disks such as CD-ROMs; and other persistent (also called nonvolatile) storage devices such as core, ROM, PROM, flash memory, or battery backed RAM.

With the preferred embodiment of the invention disclosed herein in detail, we identify 3 types of addresses associated with a page: a virtual address, a real address, and a physical address. The OS is responsible for converting virtual addresses to real addresses via usual memory management techniques.

The memory controller is responsible for converting real addresses to the physical addresses where the compressed data are actually stored. We assume that the memory controller has the capability to store a page either compressed, or uncompressed.

Depending on the characteristics of the controller, this may be done either:

1. on a per page basis via an indicator bit that is settable by the OS
2. on a range of real addresses, i.e., all real addresses in a certain range (or ranges) are stored uncompressed and all other pages are stored compressed.

We further assume that the hardware is capable of separately counting the number of blocks that are stored in the compressed and uncompressed regions; we refer to these counts as NC and NU, respectively. If, for example, there are 16 256 byte blocks per 4K byte page, then NU=16 * the number of pages allocated uncompressed. These counts can be made available to the OS upon request to the hardware.

Using one of the above mechanisms, the OS assigns pages in the kernel (or a specified subset of the kernel) to be uncompressed. For example, in implementing 2 above, many OS's assign the kernel virtual addresses in a fixed, pre-determined and known range. Thus a request for a kernel page may be identified by the virtual address into which the real address is mapped. Thus, upon seeing a request for a virtual address in the kernel's virtual address range, the OS can assign a real address in the uncompressed range. By making this real address range at least as large as the kernel's virtual address range, any such request for a kernel page can always be satisfied by a page with a real address in the required range.

Alternatively, specific requests for kernel pages can be tagged when the request is made, thereby indicating that the page can be tagged when the request is made, thereby indicating that the page should be uncompressed. As such pages are already uncompressed, they cannot expand.

A variation of the above would not actually require that kernel pages be uncompressed, but would instead have hardware keep track of the number of blocks currently assigned to the kernel (which as above might be assigned to a specific set of real addresses), which together with the current page count for the kernel could provide a means for calculating its maximum expansion.

A further variation would allow the space left-over from kernel compression to be used for other real pages, provided these real pages were backed up on disk, and thus could be immediately cleared by the 'emergency interrupt handler'.

The L3 cache may be comprised of C blocks and the OS may maintain a count I of the maximum number of blocks required to satisfy all incoming I/O. We further assume the following 2 quantities are known by the OS:

1. E: the maximum amount by which memory can expand due to application processing until the emergency interrupt is recognized on all processors.
2. M: the maximum number of blocks represented by the OS allocating new pages during the period until the emergency interrupt is recognized and the subsequent period during which the interrupt services.

Both E and M are relatively small numbers that can be determined based on the hardware and software characteristics of the system.

Let F denote the number of free blocks in the memory: F=N−NC−NU, where N is the total number of blocks in the system. The hardware is capable of signaling interrupts when F drops below a threshold which may be set by the OS. We assume the controller issues the emergency interrupt when the amount of free space, F, drops below T1=C+I+E+M. Upon receiving this interrupt, the OS frees up a certain amount of space (perhaps using the thresholds described in copending patent application Ser. No. 09/021,333). We assume that the OS is always capable of freeing enough pages so that the number of pages resident in the physical memory is at most N/b pages, where b is the maximum number of blocks a page can occupy (this, for example, places a restriction on how pages can be "pinned" by the OS). With the threshold set as above, the system is guaranteed not to abend.

In a system with compressed main memory, the invention prevents system abends due to a deterioration in the compression ratio. The operating system identifies certain pages as being in a critical part of the kernel. Those critical pages are either left uncompressed, or are compressed but their aggregate compression ratio is accounted for separately. The memory controller issues an emergency interrupt when the amount of free space drops below a certain level. The system responds to the interrupt by creating new free space (by writing pages to disk, if necessary, and zeroing them).

The present invention includes features, for example the free-space manager, which can be included in an article of manufacture (e.g., one or more computer program products) having, for instance, computer useable media. The media has embodied therein, for instance, computer readable program code means for providing and facilitating the capabilities of the present invention. The article of manufacture can be included as a part of a computer system or sold separately.

The system and processes depicted herein are just exemplary. There may be many variations to the drawings or the steps (or operations) described with reference thereto without departing from the spirit and scope of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit and scope of the invention as defined in the following claims.

Having thus described our invention, what we claim as new, and desire to secure by Letters Patent is:

1. In a computer system with compressed main memory and an expansible operating system Kernel, the method comprising:
   recognizing that a page allocated by the operating system is in a specified subset of kernel pages; and
   keeping said page uncompressed to guarantee forward progress based on limiting the effect of operating system Kernel expansion.

2. A method according to claim 1, further including the steps of compressing other pages, and accounting separately for the aggregate compression ratio of the compressed and uncompressed pages.

3. A method according to claim 1, wherein the recognizing step includes the step of recognizing that the page is allocated by the operating system is a kernel page by inspecting a virtual address of the page.

4. A method according to claim 1, wherein the keeping step includes the step of assigning to the page a real address within a memory region where data remains uncompressed.

5. A method according to claim 1, wherein the keeping step includes the step of assigning to the page a real address within a memory region where a count is kept of the number of assigned pages and the actual physical space used.

6. Apparatus, for use with a computer system with compressed main memory and an expansible operating system Kernel, the apparatus comprising:
   means for recognizing that a page allocated by the operating system is in a specified subset of kernel pages; and
   means for keeping said page uncompressed to guarantee forward progress based on limiting the effect of operating system Kernel expansion.

7. Apparatus according to claim 6, further including means for compressing other pages, and means to account separately for the aggregate compression ratio of the compressed and uncompressed pages.

8. Apparatus according to claim 6, wherein the recognizing means includes means for recognizing that the page is allocated by the operating system is a kernel page by inspecting a virtual address of the page.

9. Apparatus according to claim 6, wherein the keeping means includes means for assigning the page to a special region where data remains uncompressed.

10. Apparatus according claim 9, wherein the special region is one where a count is kept of the number of assigned pages and the actual physical space used.

11. In a computer system including an operating system and a compressed memory wherein a unit of memory allocation can occupy a variable amount of physical memory space, a method of managing the compressed memory comprising the steps of:
   recognizing that a page allocated by the operating system is in a specified subset of kernel pages; and
   keeping said page uncompressed to guarantee forward progress based on limiting the effect of operating system Kernel expansion.

12. A method according to claim 11, further including the steps of compressing other pages, and accounting separately for the aggregate compression ratio of the compressed and uncompressed pages.

13. A method according to claim 12, wherein the recognizing step includes the step of recognizing that the page is allocated by the operating system is a kernel page by inspecting a virtual address of the page.

14. In a computer system including an operating an operating system and a compressed memory wherein a unit of memory allocation can occupy a variable amount of physical memory space, apparatus for managing the compressed memory comprising:
   means for recognizing that a page allocated by the operating system is in a specified subset of kernel pages; and
   means for keeping said page uncompressed to guarantee forward progress based on limiting the effect of operating system Kernel expansion.

15. Apparatus according to claim 14, further including means for compressing other pages, and means to account separately for the aggregate compression ratio of the compressed and uncompressed pages.

16. Apparatus according to claim 15, wherein the recognizing means includes means for recognizing that the page is allocated by the operating system is a kernel page by inspecting a virtual address of the page.

17. A computer program storage device, for use with a computer system with compressed main memory and an expansible operating system Kernel, readable by a machine, tangibly embodying a program of instructions executable by the machine to perform method steps comprising:
   recognizing that a page allocated by the operating system is a kernel page; and keeping said page uncompressed to guarantee forward progress based on limiting the effect of operating system Kernel expansion.

18. The computer program storage device of claim 17, wherein said method steps further include the steps of compressing other pages, and accounting separately for the aggregate compression ratio the compressed and uncompressed pages.

19. The computer program storage device of claim 18, wherein the recognizing step includes the step of recognizing that the page is allocated by the operating system is a kernel page by inspecting a virtual address of the page.

20. An article of manufacture, comprising:
 a computer usable medium having computer readable program code embodied therein for use with a computer operating system with compressed main memory and an expansion operating system Kernel, the computer readable program code in said article of manufacture comprising:
 computer readable program for causing the computer to recognize that a page allocated by the operating system is in a specified subset of kernel pages; and
 computer readable program code for causing the computer to keep said page uncompressed to guarantee forward progress based on limiting the effect of operating system Kernel expansion.

21. An article of manufacture according to claim 20, further including computer readable program code for compressing other pages, and causing the computer to account separately for the aggregate compression ratio of the compressed and uncompressed pages.

22. An article of manufacture according to claim 21, wherein the computer readable program code includes code for causing the computer to recognize that the page allocated by the operating system is a kernel page by inspecting a virtual address of the page.

23. An article of manufacture according to claim 20, wherein the computer readable program code for keeping said page uncompressed includes computer readable program code for causing the computer to assign to the page a real address within a region where data remains uncompressed.

24. An article of manufacture according to claim 20, wherein the computer readable program code for keeping said page uncompressed includes computer readable program code for causing the computer to assign to the page a real address within a region where a count is kept of the number of assigned pages and the actual physical space used.

25. In a computer system with compressed main memory and an expansible operating system Kernel, a method comprising:
 recognizing that a page allocated by the operating system is in a specified subset of kernel pages;
 assigning said page to a special class;
 compressing said page;
 accounting separately for the aggregate compression ratio of the pages in said class; and
 reserving enough free space to allow maximum expansion of compressibility of all pages in said class to guarantee forward progress based on limiting the effect of operating system Kernel expansion.

26. A method according to claim 25, wherein the recognizing step includes the step of recognizing that the page is allocated by the operating system by inspecting a virtual address of the page.

27. A method according to claim 25, wherein the assigning step includes the step of assigning to the page a real address within a memory region in which data are compressed.

28. In a computer system with compressed main memory and an expansible operating system Kernel, apparatus comprising:
 means for recognizing that a page allocated by the operating system is in a specified subset of kernel pages;
 means for assigning said page to a special class;
 means for compressing said page;
 means for accounting separately for the aggregate compression ratio of the pages in said class; and
 means for reserving enough free space to allow maximum expansion of compressibility of all pages in said class to guarantee forward progress based on limiting the effect of operating system Kernel expansion.

29. Apparatus according to claim 28, wherein the means for recognizing includes means for recognizing that the page is allocated by the operating system by inspecting a virtual address of the page.

30. Apparatus according to claim 28, wherein the means for assigning includes means for assigning to the page a real address within a memory region in which data are compressed.

* * * * *

UNITED STATES PATENT AND TRADEMARK OFFICE
CERTIFICATE OF CORRECTION

PATENT NO.    : 6,279,092 B1
DATED         : August 21, 2001
INVENTOR(S)   : P. Franaszek et al.

It is certified that error appears in the above-identified patent and that said Letters Patent is hereby corrected as shown below:

Title page,
Item [56], References Cited, OTHER PUBLICATIONS, insert
-- Ziv, J. et al. (1977). "A Universal Algorithm for Sequential Data Compression".
IEEE Transactions on Information Theory, Vol. IT-23:3, pgs. 337-343. --

Column 8,
Line 20, "according Claim 9" should read -- according to Claim 9 --
Lines 42 & 43, delete second instance of "an operating"

Column 9,
Line 7, "ratio the compressed" should read -- ratio of the compressed --
Line 15, "computer operating system" should be -- computer system --

Signed and Sealed this

First Day of October, 2002

Attest:

Attesting Officer

JAMES E. ROGAN
Director of the United States Patent and Trademark Office